United States Patent Office 2,745,886
Patented May 15, 1956

2,745,886

PROCESS FOR FLUORINATING ALIPHATIC HALO-HYDROCARBONS WITH A CHROMIUM FLUORIDE CATALYST AND PROCESS FOR PREPARING THE CATALYST

Robert P. Ruh and Ralph A. Davis, Midland, Mich., assignors to The Dow Chemical Company, Midland, Mich., a corporation of Delaware No Drawing. Application January 31, 1955,
Serial No. 485,306

18 Claims. (Cl. 260—653)

This invention relates to an improved fluorination catalyst, and to a process for fluorinating halohydrocarbons to highly fluorinated products with the aid of this catalyst.

Heretofore, it has been known that chromium fluoride is useful in promoting the vapor-phase fluorination reaction of hydrogen fluoride with certain haloalkanes at elevated temperatures above 350° C. In U. S. Patent 2,110,369, Leicester discloses that chromic fluoride supported on carbon in a massive or granular form is a suitable catalyst in such a process. This catalyst is shown to be effective at temperatures between 450° C. and 550° C. in catalyzing the reaction of carbon tetrachloride with hydrogen fluoride to form $CCl_3F$ and $CCl_2F_2$ as the chief reaction products. Although Leicester obtained only 8 percent $CClF_3$ in carrying out this reaction at 550° C. he indicates that $CF_4$ may be formed at this same temperature if a large proportion of hydrogen fluoride to carbon tetrachloride is employed.

This supposition, however, has recently been controverted by U. S. Patent 2,458,551 to Benning et al. who found that $CrF_3$ supported on activated carbon, or pellets of $CrF_3$ per se, will not effectively catalyze the reaction of HF with $CCl_4$ to form $CF_4$ unless a relatively high temperature in the range of from 700° C. to about 1000° C. is employed. In fact, Benning et al. show that at temperatures below about 700° C., only insignificantly small amounts of $CF_4$ are produced even if HF is present in an amount up to 300 percent in excess of that theoretically required to prepare $CF_4$. For example, when HF and $CCl_2F_2$ in a mole ratio of 3.9:1 were passed over a $CrF_3$ catalyst at 674° C., only 0.4 percent conversion to $CF_4$ was obtained.

While the catalysts set forth in the above patents have been recommended broadly for the reaction of chloromethanes and hydrogen fluoride, they are effective mainly in inducing the formation of fluorinated products containing a low degree of fluorine substitution. These catalysts are even less effective in the reaction of hydrogen fluoride with bromoalkanes than with chloroalkanes due to excessive decomposition. For this reason, the production of highly fluorinated bromoalkanes, such as bromotrifluoromethane by vapor-phase reactions with hydrogen fluoride has not been commercially practicable. In fact, it is only recently that $CF_3Br$ has been prepared by any method.

The present invention is an advance over these known practices. It is based on the discovery that hydrated chromium fluoride may be activated with oxygen as hereinafter particularly described, and that the material so activated is very effective in catalyzing the vapor-phase fluorination reaction of haloalkanes and hydrogen fluoride. In fact, the catalysts of the invention, believed to be basic chromium fluorides, are more active than $CrF_3$, or any of the catalysts known in the literature. They are also more effective in directing the course of the vapor-phase fluorination to greater conversions and yields of more highly fluorinated products, and at much lower temperatures, than has heretofore been achieved. For example, at a temperature as low as 150° C., $CCl_4$ and HF are reacted preponderantly to $CCl_2F_2$, while at a slightly higher temperature e. g. 250° C., $CCl_4$ is fluorinated predominantly to $CF_3Cl$ and $CF_4$. It has also been discovered that bromoalkanes react readily with hydrogen fluoride over these new catalysts to produce highly fluorinated bromoalkanes, i. e. $CBr_4$ is fluorinated to $CF_3Br$. Additionally, as is disclosed in a co-pending application Serial No. 485,307, filed January 31, 1955, trichloroacetonitrile and hydrogen fluoride in at least equimolecular proportion can be reacted over a chromium basic fluoride catalyst of the invention at a temperature of from 300° C. to 600° C. and preferably from 400° C. to 500° C. to form monofluorodichloro-, difluorochloro-, and trifluoro- acetonitrile.

The compounds which may be fluorinated using catalysts according to the invention are partially or completely halogenated aliphatic hydrocarbons containing no more than four carbon atoms, no iodine, and at least one halogen other than fluorine. More specifically, the aliphatic halohydrocarbon reactants have from one to four carbon atoms including at least one carbon atom which is attached to a minimum of two halogens of atomic number not greater than 35, viz., fluorine, chlorine, or bromine, at least one of said halogens being of atomic number from 17 to 35 inclusive, viz., chlorine or bromine. The aliphatic halohydrocarbon reactant is, therefore, a chloro-, bromo-, or chlorobromo- substituted product of a hydrocarbon (or fluorohydrocarbon). When the halohydrocarbon reactant contains hydrogen atoms and two or more carbon atoms in the molecule, from the standpoint of thermal stability it is desirable that all of the halogen atoms be attached to a single carbon atom. In general, saturated halohydrocarbons are employed as reactants in the present process, preferably one to two carbon atom perhaloalkanes or haloalkanes having from one to two carbon atoms and from three to four chlorine or bromine atoms attached to a single carbon atom, e. g. carbon tetrachloride, chloroform, or 1,1,1-trichloroethane or the bromine analogues thereof. Other halomethanes which are fluorinated by the process of the invention are methylene chloride, methylene bromide, methylene chlorobromide, dichlorofluoromethane, dibromofluoromethane, bromochlorofluoromethane, dichlorodifluoromethane, dibromodifluoromethane, bromochlorodifluoromethane, trichlorofluoromethane, tribromofluoromethane, dibromochlorofluoromethane, bromodichlorofluoromethane, etc.

Two other haloethane reactants fluorinated by the instant process are unsymmetrical tetrachloroethane and hexachloroethane. Typical of the three and four carbon atoms reactants which may be employed are 1,1-dibromopropane, 1,1,1 - trichloropropane, 2,2 - dichloropropane, 1 - bromo - 1 - chloro - butane, 1,1,1 - trichloro - butane and 2,2-dichlorobutane.

Most unsaturated aliphatic chlorohydrocarbons can be reacted with gaseous chlorine and hydrogen fluoride over a basic chromium fluoride catalyst of the invention to prepare fluorinated haloalkane reaction products containing no more hydrogen atoms than the initial chlorohydrocarbon reactant, i. e. reaction products which have not been hydrofluorinated. For example, when vaporized perchloroethylene admixed with at least 0.5 of a molecular proportion of chlorine and at least an equimolecular proportion of hydrogen fluoride is passed at a reaction temperature through a bed of a basic chromium fluoride catalyst, the same fluorochloroethane reaction products are produced as when hexachloroethane and hydrogen fluoride are reacted under similar conditions. For high conversions, perchloroethylene is usually admixed with at least an equimolecular proportion of chlorine and with about one, two, three, or four molecular proportions of hydrogen fluoride depending on whether the chief reaction product is to be $CCl_3$—$CCl_2F$, $CCl_2F$—$CCl_2F$, $CCl_2F$—$CClF_2$, or $CClF_2$—$CClF_2$.

In some instances unsaturated aliphatic hydrocarbons can be fluorinated in accordance with the present process, this being accomplished without altering the degree of unsaturation. Suitable halohydrocarbons are those having two or more halogen atoms (viz. chlorine, bromine, or fluorine atoms), at least one of which is chlorine or bromine, attached to a carbon atom which is at least once removed from double bonded carbon atoms which are in turn attached to a total of at least one, and preferably two or more, chlorine, bromine, or fluorine atoms. Illustrative of these unsaturated aliphatic halohydrocarbons are $CHCl$=$CClCCl_3$, $CF_2$=$CClCClF_2$, $CCl_2$=$CFCHCl_2$, $CF_2$=$CFCHBr_2$, $CHCl$=$CHCCl_3$, $CClF$=$CF$—$CCl_2$—$CCl_2F$, $CHCl$=$CF$—$CH_2$—$CCl_3$, and $CF_2$=$CCl$—$CCl_2$—$CH_2F$. Halogen atoms attached to double bonded carbon atoms are not replaced by fluorine during the process of the invention unless chlorine (or bromine) is admixed with the unsaturated halohydrocarbon, together with HF, as described in the preceding paragraph, thereby producing saturated fluorine-containing reaction products.

As previously indicated, the new and improved catalysts of the invention may be prepared by heating a hydrated chromium fluoride to a temperature in the range of from about 350° to 750° C. in the presence of oxygen. By such treatment, the hydrated chromium fluoride is at least partially converted to a basic chromium fluoride as hereinafter described. It is essential that a hydrated chromium fluoride be employed since it has been shown experimentally that the improved catalytic compositions of the invention cannot be prepared from anhydrous chromium fluoride, $CrF_3$. Likewise, the catalytic activity of $CrF_3$ cannot be increased by heating to a temperature of from 350° to 750° C. in the presence of oxygen.

Ordinarily the trihydrate of chromium fluoride, $CrF_3 \cdot 3H_2O$, is initially employed to prepare the novel catalysts of the invention, although any of the higher hydrates may satisfactorily be used, such as the hemiheptihydrate, $CrF_3 \cdot 3\frac{1}{2}H_2O$; the tetrahydrate, $CrF_3 \cdot 4H_2O$; the hexahydrate, $CrF_3 \cdot 6H_2O$; the enneahydrate, $CrF_3 \cdot 9H_2O$; and the like. It is the chromium fluoride trihydrate, though, which is preferred both from the standpoint of ease of preparation, e. g. availability, and ease of handling. Regardless of which of the higher hydrates is initially employed, all lose water of hydration upon heating and become the trihydrate prior to or during the early stages of the activation process. The preferred chromium fluoride hydrate used to prepare the catalysts of the invention is obtained by first reacting chromium trioxide ($CrO_3$) with excess strong aqueous hydrofluoric acid in the presence of oxidizable organic matter, and thereafter heating the resultant reaction product to sensible dryness. A sufficient amount of oxidizable organic material should be employed in the chromium trioxide-hydrofluoric acid reaction to reduce substantially all of the chromium to the trivalent state, substances such as formaldehyde, toluene, xylene, sugar, polyethylene, and the like being satisfactory for this purpose. Ordinarily hydrofluoric acid of about 50 to 70 weight per cent strength is added to the solid chromium trioxide to slurry it, the addition of hydrofluoric acid being continued until all of the chromium trioxide is dissolved. When the dissolution is carried out in a metal container, e. g. of a magnesium metal alloy, little if any reaction occurs between the hydrofluoric acid and the chromium trioxide until the oxidizable organic compound, e. g. sugar, is added. When the dissolution is conducted in a polyethylene vessel, however, enough of the polyethylene is attacked to effect the desired reaction. Upon conducting the reaction to completion and cooling the reaction product, a bright green semi-solid mass is obtained which is heated to sensible dryness, e. g. at a temperature of from 90° to about 110° C. The product so dried appears by X-ray diffraction and other analyses to consist preponderantly of alpha chromic fluoride trihydrate, $\alpha$—$CrF_3 \cdot 3H_2O$. This material may, if desired, be broken or ground into fragments or granules and activated by heating in a stream of oxygen or air as hereinafter particularly described. Usually the sensibly dry hydrate is coarsely ground, e. g. to pass through a 10 mesh screen, then graphite is admixed therewith in an amount equal to about 2 per cent by weight, and the resultant mixture pelleted. It is these pellets which are then activated. Alternatively, the hydrated chromium fluoride may be slurried with water and pasted on a carrier, such as activated charcoal or magnesium fluorine gel, and then activated, or heated to sensible dryness and then activated.

As hereinbefore stated, the novel basic chromium fluoride catalysts of the invention are prepared by heating a hydrated chromium fluoride, e. g. $CrF_3 \cdot 3H_2O$, in the presence of oxygen at a temperature in the range of from about 350° to 750° C. When a carbonaceous material, such as graphite, is used to prepare pellets of the hydrated chromium fluoride, it is generally desirable to carry out the activation at a sufficiently high temperature to burn off the carbon. An activation temperature in the range of from about 500° to about 600° or 650° C. is satisfactory for oxidizing carbon and is generally preferred for preparing catalysts of optimum activity. It is also advantageous to heat the chromium fluoride rapidly to the temperature at which it becomes activated, e. g. above 350° C. when highly active catalysts are desired. Prolonged preliminary heating at lower temperatures, e. g. at about 200° C., should be avoided since such treatment usually produces catalysts of lower activity containing substantial amounts of catalytically inactive $Cr_2O_3$.

By activation in the presence of oxygen is meant activation (1) with substantially pure oxygen gas, (2) with a gas containing molecular oxygen, or (3) with a compound which liberates or releases oxygen under activation conditions, e. g. $CrO_3$. Activation is usually accomplished by passing a stream of a gas comprising molecular oxygen, such as oxygen or an oxygen-containing gas, e. g. air, through a heated bed of the hydrated chromium fluoride. The initial moisture content of the activating gas stream does not appear to have any effect on the activity of the resultant catalyst. Activation in a stream of oxygen, however, ordinarily produces catalysts which are catalytically active at lower temperatures, i. e. approximately 25° to 50° C. lower, than catalysts which are prepared in a stream of air. Alternatively, the hydrated chromium fluoride may be acitvated upon first admixing it with a small but effective amount of a substance, e. g. chromium trioxide ($CrO_3$) which will decompose to liberate oxygen at a temperature within the range of about 350° to 750° C. and thereafter heating the mixture, preferably after pelletization, to a temperature at or above which said substance decomposes to liberate oxygen. A mixture of $CrF_3.3H_2O$ and $CrO_3$, the latter being present in a minor proportion up to about 50 per cent by weight, is desirably pelletized with graphite and then activated by heating at a temperature above about 420° C., the temperature at which $CrO_3$ decomposes to liberate oxygen. No oxygen other than that liberated by the thermal decomposition of $CrO_3$ is necessary for the activation step. Chromic oxide viz. $Cr_2O_3$, does not decompose to liberate oxygen upon heating and therefore does not aid in the activation of hydrated chromium fluorides in accordance with the method of the invention. In fact, catalysts prepared by heating pellets of a mixture of $CrF_3.3H_2O$ and $Cr_2O_3$ at about 550° C. are catalytically less active than $CrF_3$ per se in the vapor phase reaction of $CCl_4$ and HF. Furthermore, the presence of $Cr_2O_3$ in substantial amounts appears to affect adversely the catalytic activity of the basic chromium fluoride catalysts of the invention.

Heating in the presence of oxygen should be carried out for a time sufficiently long (at least 10 minutes) to convert at least partially some of the hydrated chromium fluoride to basis chromium fluoride, the final catalyst containing at least 0.1 percent by weight and preferably from 1 to 20 or more per cent by weight of this substance. In general, activation is substantially complete after heating at an activation temperature in the presence of oxygen for a period of ½ to 2 hours, although heating may be prolonged for as long as 20 hours or more without adversely affecting the catalytic activity.

Following activation of the catalyst by heating in the presence of oxygen, it is usually desirable, but not essential, to pass anhydrous hydrogen fluoride over the catalyst for a short time prior to using it in a fluorination reaction. This step is carried out as a precautionary measure, i. e. to purge any residual oxygen gas from the reaction vessel before introducing the halohydrocarbon, and does not appear to affect the activity of the catalyst. However, passing a halohydrocarbon over the heated catalyst in the absence of hydrogen fluoride quickly reduces the activity of the catalyst. Such a catalyst of lowered activity, as well as one which has lost part of its activity through prolonged use due to carbon deposition, can easily be reactivated by burn off in a stream of air. During reactivation, as well as during the initial activation step itself, a small amount of chromic trioxide, $CrO_3$, is usually present in the vent gas stream.

The highly active catalyst of the invention consists essentially of one or more basic chromium fluorides, viz. chromuim hydroxy- (or oxy-) fluorides. This catalyst is amorphous to X-ray diffraction analyses, i. e. no crystals could be detected by a method capable of distinguishing crystallites 100 angstroms or larger in size. Some crystalline hydroxy fluorides whose compositions fall within the range $CrF(OH)_2$ to $CrF_2(OH)$, commonly written $Cr(OH,F)_3$, have at times been found to be present as impurities in small proportions.

Preparing the catalysts of the invention, as well as conducting the fluorination reaction itself, may be accomplished in a tube made of, or lined with, any suitable material such as Monel, Inconel, nickel, silver, or platinum.

In carrying out the fluorination of halohydrocarbons according to the invention using the new catalyst hereinbefore characterized, the halohydrocarbon is vaporized and passed together with hydrogen fluoride through a heated bed of the catalyst at a reaction temperature in the range of from about 125° C. to 600° C. Ordinarily, however, reaction temperatures in the range of 150° to 500° C. are employed, with temperatures below 350° to 400° C. being preferred for fluorinating most of the halo- methanes and the more reactive halohydrocarbons. The fluorination temperature is dependent not only upon the reactivity of the halohydrocarbon which is to be reacted with hydrogen fluoride, but also upon the products desired, the contact time, and other factors. The optimum temperature of fluorination also varies with the activity of the catalyst which in turn depends partly upon its method of preparation, and partly upon its condition due to prolonged use, e. g. carbon surface coatings and the like.

The ratio of hydrogen fluoride to halohydrocarbon employed in the fluorination reaction may be varied within wide limits depending on the product desired. It is sometimes advantageous to use only 0.5 mole of hydrogen fluoride per mole of halohydrocarbon. Ordinarily, however, at least one mole of hydrogen fluoride is employed per mole of the organic reactant. The preferred ratio, for making a maximum of any specific fluorinated compound, is approximately equal to, or slightly in excess of, the proportion stoichiometrically required for producing that compound. For instance, in converting carbon tetrachloride to chlorotrifluoromethane, at least 3 moles of hydrogen fluoride per mole of carbon tetrachloride should be employed.

Contact times of from 1 to 20 or more seconds may be used in the fluorination process, although from 1 to 10 seconds are usually preferred. Contact times longer than 20 seconds are ordinarily not to be desired if for no other reason than low throughput. A contact time of less than 1 second usually results in insufficient conversion which necessitates recycling.

The fluorination reaction is generally carried out at a pressure slightly above atmospheric although both subatmospheric and superatmospheric pressures are operable. Aside from greater capacity per unit volume of catalyst, higher pressures are sometimes preferred to give more highly fluorinated compounds. For this purpose, pressures of from 10 to 200 pounds per square inch gauge are employed.

In some instances it has been found advantageous to carry out the vapor-phase fluorination in two or more stages, for example, using a first stage wherein fluorination is conducted at a temperature of about 200° C. and a second stage wherein fluorination is conducted at a temperature of from 300° to 350° C. If desired, subsequent stages at higher temperatures may be employed.

In the case of a difficultly vaporizable halohydrocarbon reactant, such as hexachloroethane or carbon tetrabromide, it is sometimes advantageous to admix it with a solvent diluent, such as perchloroethylene, to aid in the vaporization, said mixture then being passed, together with hydrogen fluoride, through a heated bed of the catalyst.

The gaseous products of the reaction may be separated into their component parts by known procedures, e. g. by a series of fractional condensations and distillations, water and aqueous sodium hydroxide washes, drying steps, and the like.

After prolonged use, carbon deposits are slowly built up on the catalysts of the invention. The rate of carbon deposition is affected by several factors, such as the identity of the halohydrocarbon feed and the temperature. For example, the rate of carbon formation is more rapid in the fluorination of carbon tetrabromide than carbon tetrachloride. Furthermore, the higher the temperature at which the fluorination reaction is carried out, the faster is carbon usually formed on the catalyst.

These carbon-containing catalysts of lowered activity may be regenerated as aforesaid by passing a stream of oxygen or oxygen-containing gas over the heated catalyst at a temperature of about 500° C. Heating in the presence of oxygen is continued until carbon dioxide is no longer detected in the vent gas. A stream of anhydrous hydrogen fluoride may then be passed over the catalyst to saturate the catalyst with HF prior to another fluorination run.

The examples that follow illustrate but do not limit the invention. In these examples, the terms HF efficiency, titrated conversion, and titrated organic recovery have the following meanings. The HF efficiency in mole percent is equal to the moles of HCl titrated times 100 divided by the moles of HF charged. The mole percent titrated conversion of the halohydrocarbon, $RX_m$, to the fluorohalohydrocarbon, $RX_{m-n}F_n$, is calculated as $1/n$ times the moles of HCl (or HBr) titrated times 100 divided by the moles of halohydrocarbon charged, e. g. the titrated conversion of $CCl_4$ to $CCl_2F_2$ is calculated as ½ times the moles of HCl titrated times 100 divided by the moles of $CCl_4$ charged. These terms are based on the assumption that for every gram mole of HF disappearing, one gram mole of HF has been reacted with one gram mole of the halohydrocarbon reactant to form one gram mole of HCl (or HBr). Since some halohydrocarbon reactants may be, and frequently are, di-, tri-, or poly-fluorinated, the titrated conversion is a good indication not only of the number of gram moles of halohydrocarbon fluorinated, but also of the number of gram atoms of fluorine introduced by fluorination. The weight per cent titrated organic recovery is calculated from the total weight of the product in grams plus 16.457 grams per mole of HCl titrated (or 60.916 grams per mole of HBr) times 100 divided by the total weight of the halohydrocarbon charged.

EXAMPLE 1

The vapor-phase fluorination reaction of $CCl_4$ with HF was carried out over a pelleted basic chromium fluoride catalyst of the invention as hereinafter described.

(A)

The catalyst was prepared from a commercial grade high purity $CrF_3.3H_2O$ which was first admixed with 2 weight per cent graphite and then pressed into disc-shaped pellets 3/16 inch thick by 3/16 inch in diameter. These were loaded into a 2 inch inside diameter vertical nickel reaction tube to give a bed of $CrF_3.3H_2O$ pellets 24 inches long. A stream of air was then passed upwardly through the bed of pellets at a rate of from 1 to 2 liters per minute and the pellets were then rapidly heated to a temperature of about 500° C. in a period of about 30 minutes by means of an electric furnace surrounding the reaction tube. The aforesaid flow of air and temperature were maintained constant for about 2 hours, the temperature being measured and controlled by means of a thermocouple located between the furnace and the reaction tube near the top, i. e. exit end, of the bed of pellets.

Thereafter, the temperature was lowered, the catalyst bed flushed with gaseous hydrogen fluoride for about 30 minutes, and the following 4 runs carried out by passing a vapor-phase mixture of anhydrous hydrogen fluoride and carbon tetrachloride upwardly through the catalyst bed maintained at a temperature of about 180° C. The vapor-phase reactant mixture fed to the reaction tube was formed by bubbling anhydrous hydrogen fluoride gas upwardly through liquid carbon tetrachloride contained in a heated nickel vessel, viz. vaporizer. The amount of carbon tetrachloride picked up by the hydrogen fluoride gas, i. e. the ratio of hydrogen fluoride to carbon tetrachloride, was controlled by regulating the temperature of the liquid in the vaporizer. Thus, the higher the temperature of the carbon tetrachloride, the higher was its concentration in the reactant mixture.

The effluent gas stream from the reactor was scrubbed with ice-cold water in a polyethylene vessel so as to remove the acidic constituents, viz. HCl and HF, and to condense the higher boiling constituents. Thereafter the water-scrubbed gas stream was dried by passing it first through a trap-cooled in an ice-bath and then through a tube of anhydrous calcium sulfate. Finally the substantially dry gas stream was passed into a refrigerated trap cooled in Dry Ice to condense the lower boiling components. Uncondensed gases were collected by water displacement. The scrubber water was titrated with standard sodium hydroxide and silver nitrate solutions, and from the titration values were calculated the HF efficiency, the titrated conversion, and the titrated organic recovery as previously defined. Representative samples of the organic products from all four runs were also separated into their component parts by low temperature fractional distillation in a Podbielniak column and thereafter analyzed for product distribution. From these distillation data, the mole per cent recovery, based on the carbon tetrachloride charged, was calculated for each component of the organic product. These and other data for the 4 runs are given in Table I.

As hereinbefore stated, these runs were all carried out at a temperature of 180° C. In runs 1 to 3, the molar reactant ratios of HF to $CCl_4$ were decreased from 2.3 to 1.47. In the same runs, the contact time was varied inversely as the reactant ratios. To show that reactant ratios, not contact times, were critical, a 4th run was conducted at a reactant ratio of 1.46, i. e. almost the same as that of run 3, but at a contact time almost twice as long. Very little difference was observed upon analyzing the products of runs 3 and 4.

The catalyst employed in runs 1–4 was a grey green, water insoluble solid which was found by chemical analysis to correspond approximately to the empirical formula $CrO_3F_2$. When examined by X-ray diffraction analysis, it was found to be amorphous, i. e. no crystals could be detected by a method capable of distinguishing crystallites 100 angstroms or larger in size. No anhydrous chromium fluoride, $CrF_3$, was observed by X-ray diffraction.

(B)

A fifth run was carried out over a $CrF_3$ catalyst not in accord with the invention prepared by passing nitrogen, not air, over a bed of high purity commercial $CrF_3.3H_2O$ pellets containing 2 weight per cent graphite. Except for employing nitrogen instead of air, the method employed in the preparation of this catalyst, the volumes, temperatures, and time were all the same as those of (A) above, including the final purge step with gaseous hydrogen fluoride. Run Number 5 was conducted according to the same general procedure and in the same equipment described in (A) by passing a vapor-phase mixture of HF and $CCl_4$ in a mole ratio of 1.63 over the catalyst heated to a temperature of 250° C. for a period of 30 minutes. Even at this higher temperature, the HF efficiency and the titrated conversion to $CCl_2F_2$ were considerably lower than in the preceding runs. A study of the organic recoveries after distillation shows that the product of run 5 actually contained less than 4 mole per cent $CCl_2F_2$, while greater than 50 mole per cent $CCl_2F_2$ was present in each of the products of the runs of (A) above. This and other data for run 5 are shown in Table I.

This catalyst was found by X-ray diffraction analysis to consist preponderantly of anhydrous chromium fluoride, $CrF_3$.

EXAMPLE 2

The reaction of $CCl_4$ with HF was catalyzed with a fragmented basic chromium fluoride catalyst as described below.

(A)

The catalyst was prepared by first dissolving 1580 grams of $CrCl_3$ in water and admixing it with excess aqueous ammonium hydroxide to precipitate chromium hydroxide, filtering the precipitate and washing it with water, and thereafter reacting the precipitate with 1000 grams of 60 weight per cent hydrofluoric acid.

Approximately one-fifth of this green chromium fluoride reaction product was then dried to a hard cake by heating it overnight in a steam oven at 95° C. The resultant $CrF_3 \cdot 3H_2O$ was broken up into fragments that passed through a 4 mesh but not a 12 mesh screen. Some of these fragments were loaded into the same nickel reaction tube employed in Example 1 thereby forming a bed of $CrF_3 \cdot 3H_2O$ fragments 2 inches in diameter by 12 inches in length. After starting a stream of moist air through the reaction tube at a rate of from 1 to 2 liters per minute, the temperature was raised to 550° C. and held therefore about two hours. Thereafter the flow of air was discontinued, the temperature of the bed lowered, and a stream of anhydrous hydrogen fluoride passed over the catalyst for a short time.

Through this bed of catalyst maintained at a temperature of 250° C. was then passed a vapor-phase mixture of HF and $CCl_4$ in a mole ratio of 1.41 according to the general procedure described in Example 1. All of the data for this run (run 6) are given in Table I.

The catalyst employed in run 6 was amorphous to X-ray diffraction.

(B)

Another $CrF_3$ catalyst not in accordance with the invention was prepared by passing a stream of nitrogen, not air, over some of the 4 to 12 mesh fragments of $CrF_3 \cdot 3H_2O$ whose preparation is described in part (A) above. A stream of nitrogen gas at a rate of from 1 to 2 liters per minute was passed for 4.5 hours through a 23 inch bed of these chunks heated to 450° C. in the 2 inch nickel reaction tube previously employed. After purging the catalyst bed with anhydrous hydrogen fluoride, a vapor mixture of HF and $CCl_4$ was passed through the catalyst bed first at 550° C. (run 7) and then at 250° C. (run 8), the molar ratios of HF to $CCl_4$ being 1.33 and 1.68 for run 7 and run 8 respectively.

After these runs, a stream of moist air at a rate of from 1 to 2 liters per minute was passed for two hours through the catalyst bed heated to a temperature of 550° C. Following treatment of moist air, the temperature was lowered and the bed was flushed with gaseous hydrogen fluoride. Thereupon a vapor mixture of HF and $CCl_4$ in a mole ratio of 1.68 was passed for 30 minutes through the bed of catalyst at a temperature of 250° C. (run 9).

The data for all four runs (runs 6–9) are given in Table I. Upon studying the data, it will be seen that the results obtained in run 6 (according to the invention) are superior to those obtained in runs 7 to 9 inclusive (not in accordance with the invention), even though run 7 was carried out at a temperature 300° C. higher than run 6 (note especially the organic recoveries for these two runs). Also note that the activity of the catalyst employed in runs 7 and 8 (prepared by heating $CrF_3 \cdot 3H_2O$ in a stream of nitrogen gas) could not be subsequently increased by heating it in a stream of air prior to run 9.

(C)

Yet another $CrF_3$ catalyst not in accordance with the invention was prepared by first dissolving in 400 milliliters of dilute aqueous hydrofluoric acid, the remaining four-fifths of the chromium fluoride reaction product of paragraph 1, part (A) of this example. One thousand grams of 4 to 8 mesh activated charcoal was then impregnated with this acidified chromium fluoride solution. Some of the charcoal so impregnated was packed to a height of 24 inches in the nickel reaction tube and heated in a stream of nitrogen to a temperature of 450° C. at which temperature it was held for about 4.5 hours. Thereafter the reaction tube was flushed with hydrogen fluoride and the temperature of the catalyst bed raised to 550° C.

Two runs were then carried out by passing a vapor mixture of HF and $CCl_4$ over this catalyst (not in accordance with the invention), the first run (run 10) being carried out at a temperature of 550° C. employing a molar reactant ratio of 1.41 (HF to $CCl_4$), the second run (run 11) at 250° C. employing a reactant ratio of 1.60.

The data for runs 10 and 11 are contained in Table I. As shown by the product data, e. g. efficiencies, conversions, and recoveries, even run 10 which was carried out at 550° C. using a contact time of almost 18 seconds is inferior to run 3 of Example 1 (in accordance with the invention) carried out at 180° C. using a contact time of about 3 seconds. It is also worthy of note that the activities of the catalysts of runs 7–11 were of the same order of magnitude, although the surface area of the charcoal supported catalyst of runs 10 and 11 was disproportionately greater than the fragmented catalyst of runs 7–9.

EXAMPLE 3

The fluorination of $CCl_4$ with HF was conducted over a basic chromium fluoride catalyst prepared as described below.

(A)

A catalyst in accordance with the invention was prepared by reacting high purity chromium trioxide ($CrO_3$) with an excess of 70 weight percent hydrofluoric acid. The semi-crystalline bright green reaction product was heated in a drying oven at 80° C. to sensible dryness. This sensibly dry product, consisting preponderantly of

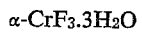
$\alpha\text{-}CrF_3 \cdot 3H_2O$ was ground to pass through a 10 mesh screen, admixed with 2 weight per cent graphite, and pressed into 3/16 inch by 3/16 inch disc-shaped pellets.

These pellets were packed to a height of about 12 inches in the 2 inch nickel reaction tube employed in the previous examples. They were then activated by heating them to, and holding them for two hours at, 500° C. in a stream of air. Thereafter the catalyst bed was cooled, flushed with hydrogen fluoride, and a vapor mixture of HF and $CCl_4$ in a mole ratio of 1.55 was passed therethrough at a temperature from 150° to 170° C. The data for this run (run 12) are contained in Table I.

(B)

Another catalyst also in accordance with the invention was prepared by passing a stream of oxygen through a bed of 3/16 inch by 3/16 inch disc-shaped pellets containing 2 weight per cent graphite prepared according to the procedure of (A) above. The dimensions of the catalyst bed and the conditions of the activation step were the same as above-described except that oxygen was employed instead of air. Following activation, the catalyst bed was cooled, purged with hydrogen fluoride, and a vapor mixture of HF and $CCl_4$ in a mole ratio of 1.74 was passed therethrough at a temperature of about 125° to 140° C. The data for this run (run 13) are shown in Table I.

As will be seen by comparing the data of runs 12 and 13, similarly good results were obtained in both runs. To produce comparable results, however, a slightly higher temperature was required with the air-activated catalyst of run 12 than with the oxygen-activated catalyst of run 13.

The catalysts employed in parts (A) and (B) above were amorphous to X-ray diffraction analysis.

EXAMPLE 4

The reaction of HF with $CCl_4$ was catalyzed with another basic chromium fluoride catalyst of the invention prepared from $CrF_3 \cdot 3H_2O$ and $CrO_3$ as hereinafter described. High purity commercial $CrF_3 \cdot 3H_2O$ (900 grams) and $CrO_3$ (300 grams) were admixed together with 2 weight percent graphite and pressed into 3/16 inch by 3/16 inch disc-shaped pellets. These pellets were packed to a height of 17 inches in the nickel reactor employed in the previous examples and heated for 2 hours at 500° C. in a stream of nitrogen gas. After cooling the reactor and flushing it with hydrogen fluoride, a vapor-phase mixture of HF and $CCl_4$ in a mole ratio of 1.6 was passed through the catalyst bed at a temperature of 250° C. The reaction data for this run (run 14) are given in Table I.

Table 1

| Run | CCl4 Feed, gms. | HF Feed, gms. | Mole Ratio, HF/CCl4 | Temp., °C. | Contact Time, sec. | Length of Run, min. | HCl Titrated, mols | HF Efficiency, mol percent | Titrated Conversion to CCl2F2, mol percent | Titrated Organic Recovery, wt. percent | Total Organic Recovery After Distillation Based on Carbon Tetrachloride Charged | | | | |
|---|---|---|---|---|---|---|---|---|---|---|---|---|---|---|---|
| | | | | | | | | | | | CClF3, mol percent | CCl2F2, mol percent | CCl3F, mol percent | CCl4, mol percent | Total, mol percent |
| 1 | 1,233 | 367 | 2.30 | 180 | 1.9 | 23 | 17.33 | 94.3 | 108.2 | 97.6 | 19.9 | 63.2 | 10.7 | 5.4 | 99.2 |
| 2 | 1,296 | 305 | 1.81 | 180 | 2.3 | 25 | 15.17 | 99.6 | 90.1 | 98.8 | 6.5 | 63.7 | 20.0 | 9.5 | 99.7 |
| 3 | 979 | 188 | 1.47 | 180 | 3.2 | 24 | 9.38 | 100 | 73.7 | 98.2 | 3.8 | 51.9 | 19.4 | 21.5 | 96.6 |
| 4 | 920 | 175 | 1.46 | 180 | 5.8 | 40 | 8.60 | 98.4 | 72.0 | 96.3 | 2.7 | 52.6 | 24.1 | 16.5 | 95.9 |
| 5* | 1,288 | 272 | 1.63 | 250 | 1.2 | 30 | 4.20 | 30.6 | 24.9 | 97.8 | 0.2 | 3.5 | 30.4 | 62.3 | 96.4 |
| 6 | 483 | 89 | 1.41 | 250 | 2.5 | 30 | 4.08 | 91.8 | 65.0 | 95.6 | 3.2 | 35.6 | 45.4 | 10.8 | 95.0 |
| 7* | 208 | 36 | 1.33 | 550 | 6.6 | 30 | 1.69 | 93.8 | 62.4 | 79.8 | 9.6 | 40.9 | 13.6 | 5.9 | 70.0 |
| 8* | 1,267 | 277 | 1.68 | 250 | 1.5 | 30 | 0.49 | 3.6 | 3.0 | 96.0 | | | | | |
| 9* | 1,366 | 298 | 1.68 | 250 | 1.4 | 30 | 0.62 | 4.2 | 3.5 | 93.0 | | | | | |
| 10* | 361 | 66 | 1.41 | 550 | 17.7 | 120 | 3.2 | 96.8 | 68.4 | 94.8 | | | | | |
| 11* | 1,277 | 266 | 1.60 | 250 | 1.8 | 30 | 2.5 | 18.8 | 15.2 | 94.4 | | | | | |
| 12 | 1,172 | 235 | 1.55 | 150–170 | 2.0 | 35 | 11.28 | 95.8 | 74.1 | 97.1 | 10.6 | 53.0 | 22.1 | 12.8 | 98.0 |
| 13 | 1,257 | 283 | 1.74 | 125–140 | 1.6 | 30 | 14.07 | 99.2 | 86.2 | 99.2 | 14.1 | 52.4 | 17.1 | 16.4 | 100 |
| 14 | 1,237 | 257 | 1.6 | 250 | 1.9 | 30 | 9.7 | 75.6 | 60.3 | 98.2 | | | | | |

*Not according to the invention.

EXAMPLE 5

To demonstrate that substantial amounts of CF4 can be produced at relatively low temperatures by reacting HF with CCl4 over one of the improved catalysts of the invention, the following run was carried out in accordance with the procedure of Example 1 (A) in the same nickel reaction tube over a 2 inch by 24 inch bed of catalyst prepared as described in the aforesaid example. The fluorination of CCl4 was conducted at a temperature of 400° C. employing a molar reactant ratio of HF to CCl4 of 7.74 and a contact time of 29 seconds. Throughout the run of 101 minutes, 88 grams CCl4 and 88 grams of HF were fed to the reactor. The organic product was condensed and fractionally distilled. Based on the CCl4 charged, a 99.7 mole per cent recovery of the organic product was obtained as follows:

|  | Mole per cent |
|---|---|
| CF4 | 16.3 |
| CClF3 | 80.0 |
| CCl2F2 | 2.2 |
| CCl3F | 0.7 |
| CCl4 | 0.5 |

EXAMPLE 6

A catalyst similar to that used in Example 3 (B) was tested for 2200 hours in the vapor-phase fluorination of CCl4 with HF, mostly at a temperature of 250° C., a reactant ratio of HF to CCl4 of about 1.3 to 1.4, and a contact time of about 2 to 3 seconds. High HF efficiencies and organic recoveries (95 to 100 mole per cent) were obtained throughout the run. During the run, the catalyst was burned off several times with oxygen at 550° C. The catalyst showed no loss in activity with burn off, being as effective after the 2200 hour run as it was initially. No appreciable physical disintegration of the catalyst was observed.

EXAMPLE 7

CCl3F and HF were reacted in the same manner and in the same nickel reaction tube over a 16 inch bed of a catalyst prepared according to the same procedure used in Example 3 (B). During a run of 45 minutes, 1947 grams (14.15 moles) of CCl3F and 102 grams (5.12 moles) of HF were passed through the catalyst bed at a temperature of 250° C. and at a contact time of 2.9 seconds. The calculated HF efficiency was 97.3 mole per cent. The organic product was separated by fractional distillation. Based on the CCl3F charged, a recovery of 100 mole per cent was obtained as follows:

|  | Mole per cent |
|---|---|
| CClF3 | 1.0 |
| CCl2F2 | 47.3 |
| CCl3F | 51.7 |

EXAMPLE 8

The fluorination of CHCl3 with HF was carried out according to the procedure of Example 1 (A) in the same nickel reaction tube and over a 24 inch bed of catalyst prepared as described in the aforesaid example. The fluorination reaction was conducted at a temperature of 400° C. employing a molar reactant ratio of 3.6 and a contact time of about 20 seconds. Throughout the run of 42 minutes, 80 grams of CHCl3 and 48 grams of HF were fed to the reactor. The organic product was separated by fractional distillation. Based on the CHCl3 charged, a 94.1 mole per cent recovery was obtained as follows:

|  | Mole per cent |
|---|---|
| CHF3 | 91.0 |
| CHClF2 | 3.1 |
| CHCl2F | 0.0 |

EXAMPLE 9

The reaction of CH2Cl2 and HF was carried out in the same manner in the same nickel reaction tube and over a 17¾ inch bed of catalyst prepared as described in Example 3 (B). Through the catalyst bed heated to 250° C. were passed 372 grams CH2Cl2 and 243 grams HF during a period of 72 minutes. This represents a mole ratio of HF to CH2Cl2 of 2.8 and a contact time of 5.9 seconds. The organic reaction product was fractionally distilled. Based on the CH2Cl2 charged, a recovery of 81.9 mole per cent was obtained as follows:

|  | Mole per cent |
|---|---|
| CH2F2 | 43.6 |
| CH2ClF | 9.1 |
| CH2Cl2 | 29.2 |

EXAMPLE 10

A vapor mixture of HF and CBr4 in a mole ratio of 8.0 was passed at a contact time of 2.2 seconds through a 12 inch bed of the same type catalyst and reacted according to the same procedure employed in Example 3 (A). During a period of 60 minutes, 865 grams of CBr4 and 408 grams of HF were put through the catalyst bed at a temperature of 300° C. Upon fractionally distilling the organic product, the recovery (based on the CBr4 charge) was found to be as follows:

|  | Mole per cent |
|---|---|
| CBrF3 | 82.3 |
| CHF3 | 4.5 |
| CBr2F2 | 7.8 |
| CBr3F | 0.8 |

EXAMPLE 11

CBr3F and HF were passed at a temperature of 250° C. through a 24 inch bed of the same type catalyst and reacted according to the same procedure employed in Example 1 (A). There were passed 947 grams $CBr_3F$ and 180 grams of HF through the catalyst bed in approximately 55 minutes. This represents a mole ratio of HF to $CBr_3F$ of 2.58 and a contact time of 8.1 seconds. Upon distillation of the organic product, the recovery was found to be as follows:

| | Mole per cent |
|---|---|
| $CBrF_3$ | 21.9 |
| $CBr_2F_2$ | 54.0 |
| $CBr_3F$ | 2.6 |

EXAMPLE 12

The reaction of HF and $CHBr_3$ in a mole ratio of 3.26 was carried out at 320° C. according to the same procedure and over a 24 inch bed of the same type catalyst employed in Example 1 (A). During 300 minutes, 3615 grams of $CHBr_3$ and 934 grams of HF were passed through the heated bed of catalyst at a contact time of 7.8 seconds. The titrated conversion to $CHBrF_2$ was 49 mole per cent.

EXAMPLE 13

$CCl_2F$—$CCl_2F$ was fluorinated with HF over a 15 inch bed of the same type catalyst and according to the same procedure employed in Example 3 (B). The fluorination was carried out for 60 minutes at 500° C. during which time 1332 grams of $CCl_2F$—$CCl_2F$ and 280 grams of HF were passed through the reaction tube. This represents a mole ratio of HF to $CCl_2F$—$CCl_2F$ of 2.15 and a contact time of 2.6 seconds. The organic product was fractionally distilled and a recovery of 94.8 mole per cent (based on the $CCl_2F$—$CCl_2F$ charged) was obtained as follows:

| | Mole per cent |
|---|---|
| $CF_3$—$CF_3$ | 1.1 |
| $CF_3$—$CClF_2$ | 4.1 |
| $CClF_2$—$CClF_2$ | 43.3 |
| $CClF_2$—$CCl_2F$ | 29.5 |
| $CCl_2F$—$CCl_2F$ | 16.8 |

EXAMPLE 14

$CF_3$—$CCl_2$—$CCl_2F$ and HF were reacted at 450° C. over a 23 inch bed of the same type catalyst in a ¾ inch inside diameter vertical nickel reaction tube according to the same procedure employed in Example 1(A). The run was carried out for 12.75 hours at an average contact time of 0.7 second and employing a mole ratio of HF to organic of 2.3. During the run, a total of 14,520 grams of $CF_3$—$CCl_2$—$CCl_2F$ and 3240 grams of HF were passed through the reaction tube. Upon separating the organic product by fractional distillation, the total recovery (based on the $CF_3$—$CCl_2$—$CCl_2F$ charged) was found to be 79 mole per cent. The organic product was 70.9 mole per cent $CF_3$—$CCl_2$—$CClF_2$ which boiled at 72° C. at 760 mm. of Hg absolute.

This application is a continuation-in-part of our prior application Serial No. 377,688, filed August 31, 1953.

That which is claimed is:

1. A method of preparing a catalyst useful in promoting the fluorination of haloalkanes by vapor-phase reaction with hydrogen fluoride, said method comprising heating a mixture of a major proportion of hydrated chromium fluoride and a minor proportion of chromium trioxide at a temperature above about 400° C. for a time sufficiently long to convert at least part of the hydrated chromium fluoride to a basic chromium fluoride.

2. A method of preparing a catalyst useful in promoting the fluorination of haloalkanes by vapor-phase reaction with hydrogen fluoride, said method consisting essentially of heating a hydrated chromium fluoride to a temperature in the range of from about 350° to 750° C. in the presence of oxygen.

3. A method of preparing a catalyst useful in promoting the fluorination of chloroalkanes by vapor-phase reaction with hydrogen fluoride, said method consisting essentially of heating a hydrated chromium fluoride to a temperature in the range of from about 350° C. to about 650° C. while passing a stream of a gas comprising molecular oxygen therethrough for a time sufficiently long for a small though effective amount of oxygen to react therewith.

4. A method according to claim 3 wherein the gas stream is oxygen.

5. A method according to claim 3 wherein the gas stream is air.

6. A method of preparing a catalyst useful in promoting the fluorination of chloroalkanes by vapor-phase reaction with hydrogen fluoride, said method comprising heating a bed of $CrF_3.3H_2O$ to an activation temperature in the range of from 350° to 650° C. while passing a stream of a gas comprising molecular oxygen therethrough, the flow of gas being maintained through said bed within said activation temperature range for a time sufficiently long to convert at least part of the hydrated chromium fluoride to a basic chromium fluoride.

7. A method according to claim 6, wherein the $CrF_3.3H_2O$ is the alpha hydrate.

8. A method of fluorinating haloalkanes which comprises passing a vapor mixture of a haloalkane having from one to four carbon atoms including at least one carbon atom which is attached to a minimum of two halogens of atomic number not greater than 35, at least one of said halogens being of atomic number from 17 through 35 inclusive, and at least an equimolecular proportion of hydrogen fluoride at a reaction temperature in the range of from 125° to 600° C. through a bed of catalyst prepared as in claim 3.

9. A method according to claim 8 wherein the haloalkane is a bromoalkane.

10. A method according to claim 9 wherein the bromoalkane is carbon tetrabromide.

11. A method according to claim 8 wherein the haloalkane is a chloroalkane.

12. A method according to claim 11 wherein the chloroalkane is carbon tetrachloride.

13. A method according to claim 11 wherein the chloroalkane is chloroform.

14. A method according to claim 11 wherein the chloroalkane is hexachloroethane.

15. A method of fluorinating aliphatic halohydrocarbons having from one to four carbon atoms including at least one carbon atom, other than a double bonded carbon atom, which is attached to a minimum of two halogens of atomic number not greater than 35, at least one of said halogens being of atomic number from 17 through 35 inclusive, and at least 0.5 of a molecular proportion of hydrogen fluoride at a reaction temperature in the range of from 125° to 600° C. through a bed of a catalyst prepared as in claim 3.

16. A method of fluorinating aliphatic halohydrocarbons having from one to four carbon atoms including at least one carbon atom, other than a double bonded carbon atom, which is attached to a minimum of two halogens of atomic number not greater than 35, at least one of said halogens being of atomic number from 17 through 35 inclusive, and at least 0.5 of a molecular proportion of hydrogen fluoride at a reaction temperature in the range of from about 125° C. to about 600° C. through a bed of a catalyst prepared by passing a gas comprising molecular oxygen into contact with a hydrated chromium fluoride heated to a temperature in the range of from about 350° C. to about 650° C.

17. A method of fluorinating haloalkanes which comprises passing a vapor-phase mixture of a haloalkane having from one to four carbon atoms including at least one carbon atom which is attached to a minimum of two halogens of atomic number not greater than 35, at least one of said halogens being of atomic number from 17 through 35 inclusive, and at least an equimolecular proportion of hydrogen fluoride through a bed of a catalyst maintained at a temperature of from about 125° C. to about 600° C., said catalyst having been prepared by heating a bed of $CrF_3 \cdot 3H_2O$ to a temperature in the range of from about 350° C. to about 650° C. and passing a stream of a gas comprising molecular oxygen therethrough for a time sufficiently long to convert at least a part thereof to a basic chromium fluoride.

18. A method of fluorinating haloalkanes which comprises passing a vapor mixture of a haloalkane having from one to four carbon atoms including at least one carbon atom which is attached to a minimum of two halogens of atomic number not greater than 35, at least one of said halogens being of atomic number from 17 through 35 inclusive, and at least an equimolecular proportion of hydrogen fluoride at a reaction temperature in the range of from about 125° C. to about 600° C. through a bed of a catalyst consisting essentially of a basic chromium fluoride.

References Cited in the file of this patent

Jacobson: "Encyclopedia of Chemical Reactions," Reinhold Publishing Corp. (1948), page 767–8.